[11] 3,596,653

| [72] | Inventor | John E. Hotchkiss |
| | | Corte Madera, Calif. |
| [21] | Appl. No. | 755,660 |
| [22] | Filed | Aug. 27, 1968 |
| [45] | Patented | Aug. 3, 1971 |
| [73] | Assignee | Hotchkiss Instruments, Inc. |
| | | Continuation-in-part of application Ser. No. 675,811, Oct. 17, 1967. |

[54] ENDOSCOPE WITH COINCIDENT ILLUMINATION AND VIEWING
16 Claims, 10 Drawing Figs.

[52] U.S. Cl. .................................................. 128/9,
240/2.18, 350/277
[51] Int. Cl. .................................................. A61b 1/22
[50] Field of Search ........................................... 128/3—16,
18, 23; 240/2.18, 6.41, 10.6, 10.62; 351/6;
350/277; 95/11 HC

[56] References Cited
UNITED STATES PATENTS

| 1,796,072 | 3/1931 | Baer .................... | 128/3 |
| 1,934,698 | 11/1933 | Cameron ................. | 128/9 |
| 2,023,945 | 12/1935 | Allyn .................... | 128/9 |
| 3,384,076 | 5/1968 | Speelman ................. | 128/9 |
| 376,601 | 1/1888 | Leiter ................... | 128/9 |
| 672,317 | 4/1901 | Dow ..................... | 128/9 |
| 799,114 | 9/1905 | Tracey ................... | 240/2.18 X |
| 807,905 | 12/1905 | Blair .................... | 128/266 |
| 1,608,726 | 11/1926 | DeZeng ................... | 128/9 |
| 2,039,546 | 5/1936 | McGerry .................. | 128/9 |
| 2,290,665 | 7/1942 | Arnesen .................. | 128/6 |
| 2,343,041 | 2/1944 | Arnesen .................. | 128/9 |
| 3,316,903 | 5/1967 | Richards ................. | 128/145.7 |
| 3,376,868 | 4/1968 | Mondiasis ................ | 128/278 |

FOREIGN PATENTS

| 381 | 1914 | Great Britain ............ | 128/9 |
| 964,567 | 7/1964 | Great Britain ............ | 128/6 |
| 1,044,844 | 10/1966 | Great Britain ............ | 128/9 |
| 7,126 | 1903 | Great Britain ............ | 128/4 |
| 12,885 | 1912 | Great Britain ............ | 351/6 |

*Primary Examiner*—Richard A. Gaudet
*Assistant Examiner*—Kyle L. Howell
*Attorney*—Warren, Rubin, Brucker & Chickering ABSTRACT: An endoscope for the simultaneous illumination and viewing of an area in a cavity, the endoscope having a housing with a sight passage between a viewing aperture and an aligned, spaced-apart sight aperture. A mirror defining a portion of the sight passage is disposed linearly opposite an electrical light source directing light on the mirror for reflection along the axis of the sight passage, through the sight aperture and onto the area being viewed. A light shield prevents the direct passage of light from the source to the viewing aperture and interior portions of the housing have nonreflecting light-absorbing surfaces to minimize glare at the viewing aperture. A magnifying lens in the sight passage is slanted to eliminate sight-disturbing glare and reflection on its surface, converges the reflected light at a point beyond the sight aperture, and magnifies the image of the area viewed at the viewing aperture. The lens separates the sight aperture from the viewing aperture and the housing includes a sealable opening adjacent the sight aperture and a porthole for connecting air-pumping means with the sight aperture to permit the performance of pneumoscopy. Means can be provided for adjusting the focal point of the reflected light. An electric power source is coupled with the light source via a switch.

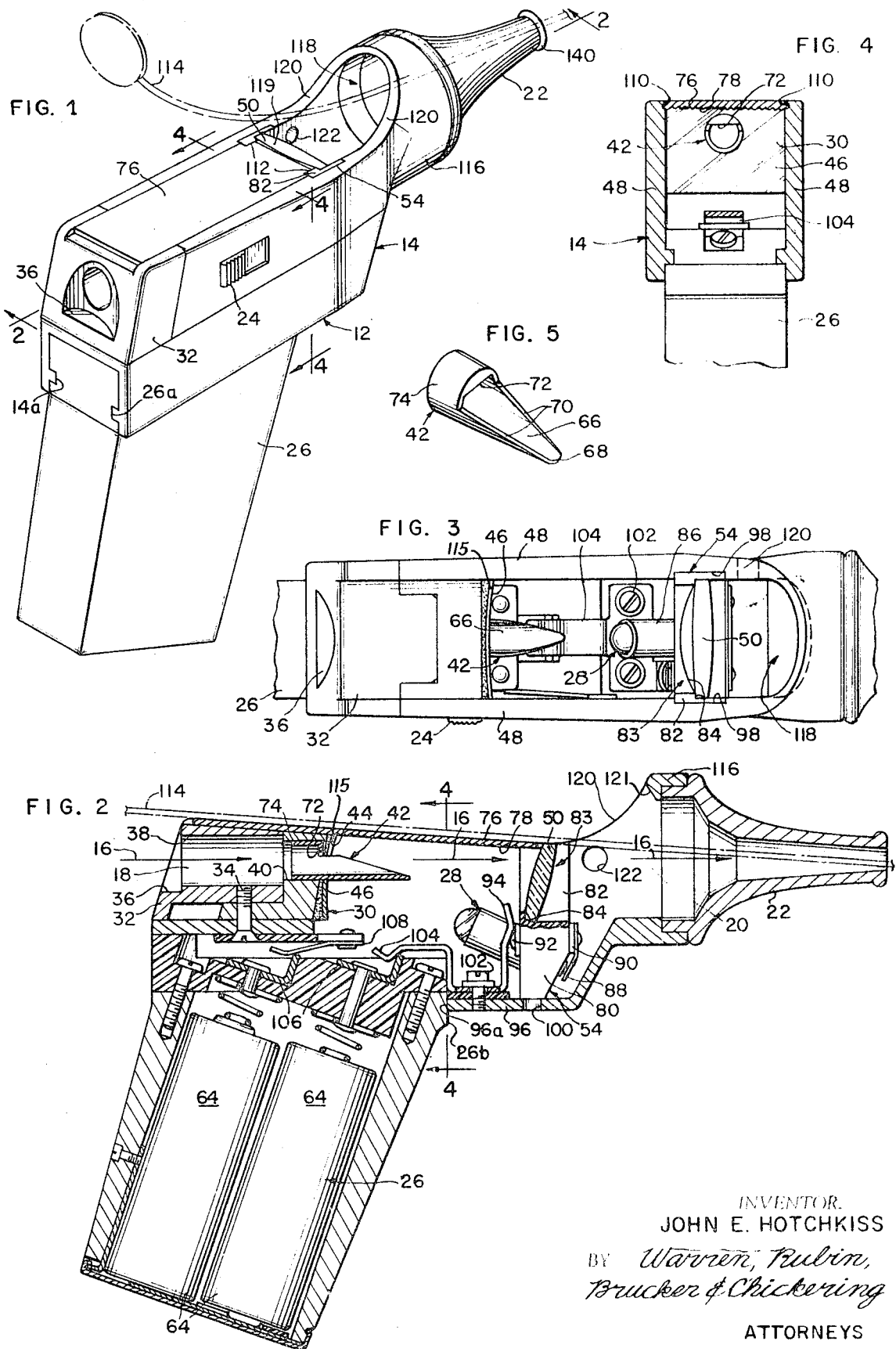

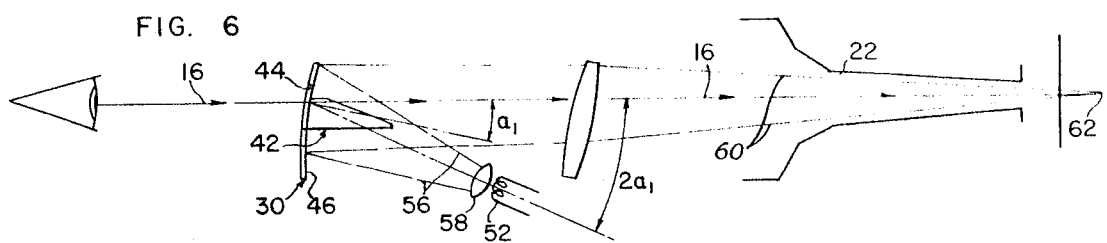
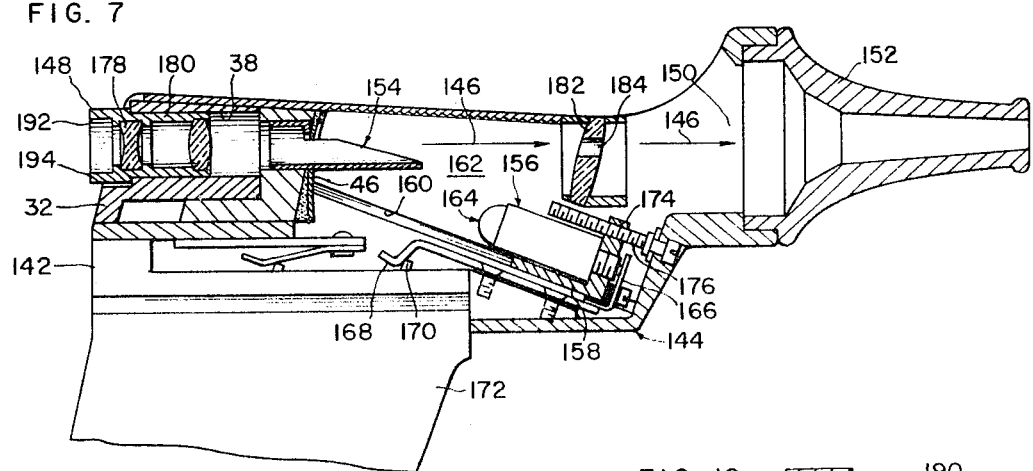
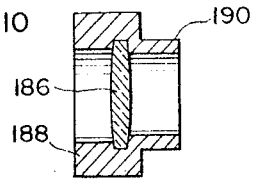
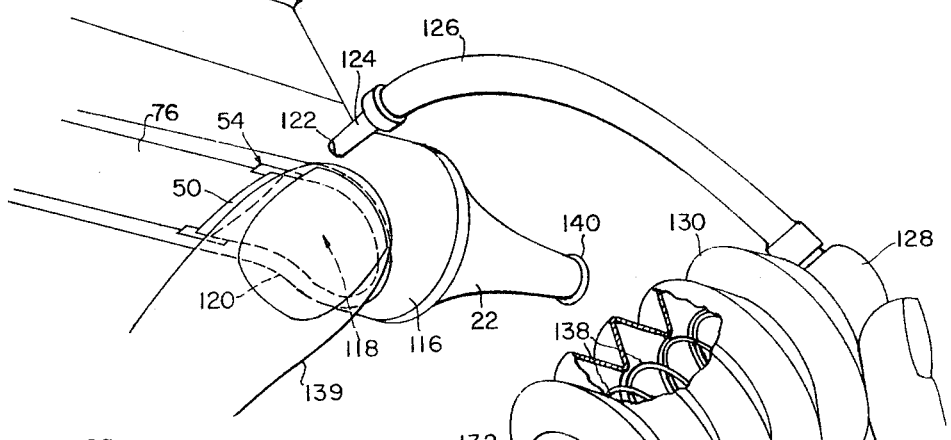
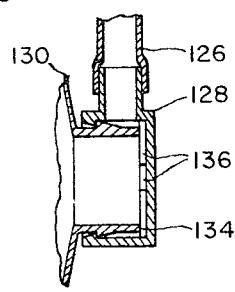

3,596,653

ENDOSCOPE WITH COINCIDENT ILLUMINATION AND VIEWING

RELATED APPLICATIONS

This is a continuation-in-part application of the pending U.S. Pat. application bearing Ser. No. 675,811, filed Oct. 17, 1967 for ENDOSCOPE WITH IMPROVED ILLUMINATION SYSTEM.

It is further related to the commonly owned copending U.S. Pat. application bearing Ser. No. 755,661, filed Aug. 27, 1968 for ENDOSCOPE, and Ser. No. 756,112, filed Aug. 29, 1968 for ENDOSCOPE FOR PHOTOGRAPHIC RECORDING.

BACKGROUND OF THE INVENTION

This invention relates to endoscopes and more particularly to an endoscope in which the illuminated and viewed areas exactly coincide.

Prior art endoscopes, such as otoscopes used for the examination of the ear canal and the tympanic membrane, have a light source which directs light through a sight aperture and speculum source which directs light through a sight aperture and speculum towards the area of the cavity being examined. Since the light source is disposed to direct light toward the object, it must be offset from the line of sight to avoid being an obstruction. Consequently, the light beam is not parallel to the line of sight, resulting in parallax which causes an offset between the illuminated area and the viewed area. Thus, the person using the endoscope views an area other than that being directly illuminated and at best views a shadowy object. In addition, since the light beam is nonparallel to the line of sight, it is reflected from interior portions of the endoscope back toward the viewing aperture causing distracting and sight-impairing glare.

Several attempts have been made in the past to improve endoscopes and rectify some of these deficiencies. One such attempt has resulted in an endoscope which employs "fiber optics" in which a large number of glass fibers are embedded in the endoscope around the end of the speculum which is inserted in the organ. The fibers transmit light from a light source to the end of the speculum inserted in the ear canal, for example, and cause the illumination of the ear canal even though they are not straight over their full length. A ring-shaped light beam, which is concentric with the viewed area, is cast onto the area, thereby eliminating parallax error. Because the light source is necessarily annular, it projects a ring of light with high light intensity on the fringes of the area being examined while the center, which is aligned with the line of sight, receives a relatively low light intensity. This, plus the high cost of such endoscopes due to the required intricate and time-consuming manufacturing methods that must be employed, have prevented fiber optic endoscopes to become generally accepted. Moreover, the light intensity decreases rapidly with an increase in the distance between the end of the fibers and the viewed area because the fibers end in random directions at the speculum. In addition, since the light emanates from the periphery of the speculum, hair, skin particles, or wax clinging to the walls of the ear canal prevents the transmission of light to the viewed area, thereby reducing the light intensity there.

In another attempt to eliminate the parallax error light source is altogether removed from the endoscope and a head mirror is employed which directs a light beam from an independent light source to the viewing aperture of the endoscope and substantially parallel with the line of sight onto the area being examined. This approach requires a plurality of independent accessories and a great skill to properly align all parts of the system and thereby illuminate the area. The slightest uncoordinated movement of the head mirror, for example, causes a loss of the alignment of the parts and thereby a loss of the illumination of the viewed area. The head mirror must be placed at a fixed distance, usually 12 to 16 inches from the endoscope which does not allow a close examination of the area since the viewer's eye cannot be brought close to the viewing aperture of the endoscope.

More recently an endoscope has become known which employs a mirror placed in the line of sight through the endoscope and reflecting light from a light source along the line of sight onto the viewed area. This endoscope, however, has a complicated optical system that requires a relatively large distance between the mirror and the light source. To prevent the instrument from having an undue length it is necessary to provide intermediate reflectors between the mirror and the light source. This and an external microscope for the magnification of the viewed area make the device heavy, large and cumbersome to handle. In addition, light from the light source can enter the magnification unit and the viewer's eye which causes disturbing and sight-impairing glare. Thus, the superior illumination offered by that device requires the acceptance of other, perhaps more undesirable shortcomings.

SUMMARY OF THE INVENTION

The present invention provides an endoscope for the simultaneous and coincident illumination and viewing of an area of a cavity. Briefly, it comprises a housing having a sight passage between a viewing aperture and an aligned, spaced-apart sight aperture. A reflector means is disposed intermediate the apertures, mounted to the housing, and defines a portion of the sight passage. An electrical light source is mounted to the housing linearly opposite the reflector means and directs light onto the reflector means and away from the area being viewed. Light is thereby reflected along the axis of the sight passage, past the sight aperture, and onto the exact area being viewed.

In the preferred embodiment of the invention the endoscope includes a lens positioned in the sight passage between the reflecting means and the sight aperture for converging reflected light at a point beyond the sight aperture and for magnifying the image of the area observed at the viewing aperture. The lens is angularly inclined with respect to the optical axis to eliminate a source of glare. A light shield is positioned adjacent the reflector means, which comprises an apertured mirror, to prevent direct passage of the light from the source through the aperture in the mirror and to the viewing aperture.

To enable pneumoscopy, the housing further includes a porthole formed to be connected with air-pumping means and an opening which can be sealed with the thumb of the hand holding the endoscope for applying tympanic-membrane-flexing air pressure to the ear canal.

While providing the advantages of illuminating the exact area being viewed the light source can be placed linearly opposite the concave mirror, thereby eliminating the need for additional intermediate reflectors and a resulting bulkiness of the endoscope. The distance between the mirror and the light source can be adjusted to fit the instrument instead of being the factor determining the length and/or size of the instrument. Thus, the endoscope is lightweight, small and compact and convenient to use as more fully set forth in the above-referenced, copending patent application entitled "ENDOSCOPE." In addition, by positioning of the lens in the sight passage no need for relatively bulky external magnification units arises, thereby further decreasing the size and weight of the endoscope. Heretofore often troublesome glare and reflections from light passing directly from the light source to the viewing aperture, or from objects, such as magnifying lenses, in the sight passage are prevented by the light shield and the angular inclination of the lens.

Moreover, even though the optical system of the endoscope is compact, space is provided for an access hole through which operating tools and instruments can be inserted past the sight aperture and into the cavity. The bright illumination of the viewed area and the glare-free viewing thereof enable operations in the cavity under the best of conditions.

BRIEF DESCRIPTION OF THE DRAWING

FIG. 1 is a perspective view of an endoscope constructed according to the present invention and shows, in phantom lines, an instrument inserted through the speculum of the endoscope;

FIG. 2 is a plan view, in section, and is taken on line 2–2 of FIG. 1;

FIG. 3 is a fragmentary plan view of the endoscope with the cover removed to show the interior of the endoscope;

FIG. 4 is a fragmentary sight elevational view taken on line 4–4 of FIG. 1;

FIG. 5 is an enlarged perspective view of a preferred light shield arrangement for the endoscope;

FIG. 6 is a schematic representation of the optics employed by the endoscope;

FIG. 7 is a fragmentary side elevational view, in section, of another embodiment of the endoscope;

FIG. 8 is a fragmentary, perspective view of an endoscope used for pneumoscopy;

FIG. 9 is a fragmentary view, in section, of the connection between the air pump bellows shown in FIG. 8 and its conduits communicating it with the endoscope, and FIG. 10 is a plan view, in section, of an eye correction lens holder adapted to be mounted on the endoscope.

DESCRIPTION OF THE PREFERRED EMBODIMENTS

Referring first to FIG. 1, an endoscope 12 as, for example, an otoscope used for examining ear canals (not shown), generally comprises a housing 14 having a sight passage 16 between a viewing aperture 18 and an aligned spaced-apart sight aperture 20. As used in this specification, the term "sight passage" denotes that unobstructed space, excluding transparent objects such as lenses, intermediate the viewing and the sight apertures through which the sight aperture is visible from the viewing aperture or vice versa. A speculum 22 is secured to the housing, projects in alignment with the sight passage from the sight aperture, and is formed to permit its insertion into the ear canal. An electric switch 24 couples an electric power source 26 with a light source 28 (see FIG. 2) disposed inside the housing and directing light via reflector means 30 (see FIG. 6) into the ear canal and onto the tympanic membrane (not shown) of the ear.

Referring now to FIGS. 2 and 3, the sight passage 16 of the endoscope lies on an axis that originates at viewing aperture 18 defined by the outermost end of an insert block 32 secured to the housing by means of a threaded bolt 34. For purposes to be described hereinafter, the block is undercut at 36. An elongated, large-diameter cylindrical bore 38 extends from the undercut to a small-diameter bore 40 at the other end of the block. Inserted into the small bore is a light shield assembly 42 which is suitably anchored in the small bore. The light shield assembly projects past the other end of the block through a hole 44 in a concave mirror or reflector 46 of reflector means 30 defining a portion of the sight passage. The mirror is constructed of a polished metal, preferably aluminum having an oxide finish which provides it with a higher coefficient of reflection than ordinary nonground glass mirrors while its manufacturing costs are substantially lower than the cost of such glass mirrors. From the outermost end of the light shield assembly, the sight passage extends through the housing as defined by vertical walls 48, past a semicircular magnification lens 50 and hence through sight aperture 20 and speculum 22. A person viewing the ear canal (not shown) through the endoscope places the viewing aperture 18 adjacent his eyes and views the ear canal or eardrum through the magnifying lens and the speculum.

Referring to FIGS. 2, 3, and 6, illumination of the viewed area is provided by light source 28 which is preferably an incandescent lamp 52 mounted in a holder 54 linearly opposite mirror 46 and directing a light beam 56 opposite to the viewing direction through the endoscope onto the mirror. A light-concentrating lens 58, which preferably forms an integral part of light source 28, converges light from the source to increase the light intensity on mirror 46. The mirror is concave and constructed so that its focal axis is inclined with respect to the optical axis of the sight passage at an angle $a_1$. The optical axis of the light beam 56 is inclined with respect to the optical axis of the sight passage by an angle twice that of the inclination of the optical axis of the mirror, or $2a_1$. Lamp 52 and lens 58 are positioned so that the focal point of the light, which may be considered the center of lamp 52, is spaced from the mirror a distance about equal to the focal length of the mirror. When the distance between the light source and the mirror equals the focal length of the mirror, light reflected by the latter travels parallel to the axis of sight passage 16. Since in that case a dark spot can occur in the reflected light beam because the center of the mirror at mirror hole 44 is nonreflective, and to increase the light intensity at the viewed area, it is presently preferred to position the light slightly more distal from the mirror than the latter's focal length. A light beam 60 reflected by the mirror thereby travels along the axis of the sight passage but converges toward the axis, as shown in FIG. 6, at a point (not shown) beyond sight aperture 20. The converging light rays thereby eliminate any dark area that could be caused by the nonreflecting mirror hole to provide the reflected light beam with an even intensity. Magnifying lens 50 changes the distance between the point at which the light rays converge and the sight aperture. Normally, the lens shortens the distance and converges the reflected light beam at a focal point 62. The image of the area viewed at the viewing aperture 18 through the lens is thereby also magnified. Converging the reflected light beam 60 has the additional advantage of reducing possible glare from light striking interior sides or components of the endoscope.

As illustrated in FIG. 6, the optical axis of the sight passage, or the line of sight through the endoscope, coincides with the optical axis of reflected light beam 60. The viewed area, therefore, is exactly the same as the illuminated area. Heretofore often troublesome parallax is eliminated and an equally distributed high incident of illumination of the viewed area is obtained.

Additionally, the light intensity at the viewed area is increased because light-concentrating lens 58, concave mirror 46, and magnifying lens 50 successively converge and concentrate light from the light source. As a result, the light intensity at the viewed area can be as much as three to four times greater than if no lenses and merely a flat mirror were employed. The higher light intensity provides a better sight and enables the use of lower watt light bulbs to preserve the life of batteries 64 (shown in FIG. 2), if such are used as the power source. Furthermore, undesirable temperature rises in the endoscope from high wattage bulbs are thereby reduced or eliminated.

Referring now to FIGS. 2 through 6, light shield assembly 42 is provided to prevent light from source 28 from passing through mirror hole 44 and entering the eye of the person using the endoscope, or from being reflected on the walls of bores 38 and 40 of block 32 and causing vision-impairing glare. The light shield includes a generally semicylindrical segment or section 66 which projects from the mirror hole toward the sight aperture and defines a portion of the viewing passage over its length. The segment shields the lower edge of the mirror hole to prevent direct passage of light from the light source to the viewing aperture and bores 38 and 40. Forward end 68 of the segment is pointed and defined by tapered sides 70 enabling a maximum amount of light from light source 28 to reach mirror 46 for reflection along the optical axis of sight passage 16. The length of the segment is just sufficient to block all light from light source 28 which would otherwise enter mirror hole 44.

Segment 66 is joined to a sleeve 74 which includes a stop portion 72 depending into the hollow space of the sleeve. Stop 72 is positioned adjacent mirror hole 44 opposite segment 66 and prevents light rays refracted on the upper edge (as viewed in FIGS. 2, 4, and 6) of the mirror hole from passing through bore 38, 40 to viewing aperture 18 and causing glare in the eye of the viewer.

Referring to FIG. 1, 2, and 4, cover 76 is slideably disposed in guides 110 of walls 48 and extends from adjacent viewing aperture 18 to adjacent lens 50. It is inset at 112 adjacent the lens permitting it to project to closely adjacent the lens, while being spaced therefrom, and to engage legs 82 of holder 54. The interior portions of the housing intermediate the lens and the viewing aperture are thereby enclosed within a compartment within housing 14 to prevent the contamination of mirror 46, light source 28, to prevent light from the source from illuminating objects adjacent the endoscope or causing glare in the eye of the viewer, and to prevent light surrounding the endoscope from causing reflections and glare on the lens.

Areas of the cover 76 exposed to light from light source 28 are provided with a light absorbing and defusing surface finish. It is presently preferred to construct the cover of aluminum, to give an interior surface 78 of the cover a satin finish, such as by anodizing it. The surface is irregularly shaped as by engraving, etching, stamping, sandblasting, etc. the material of which the cover is constructed. The finish and configuration of the interior surface of the cover thus minimize light reflections and glare thereon which could otherwise impair the sight through the endoscope.

Referring to FIGS. 2 and 6, lens 50 simultaneously converges the reflected light beam 60 and magnifies the viewed image of the illuminated area, as described above, and is slanted to angularly incline its optical axis with respect to the axis of sight passage 16. The surface of the lens facing viewing aperture 18 is thus eliminated as a possible source of glare from the reflection or refraction of the reflected light beam 60 on that surface.

An endoscope provided with which, illumination and optical system described in the preceding paragraphs gives the viewer an excellent, magnified and well-illuminated image of the area at which the endoscope is directed. Parallax errors which become increasingly pronounced with decreasing inner diameters of speculum 22 are eliminated to enable the use of the endoscope for virtually all applications. For example, small-size specula may have inner diameters of no more than 2 mm. which, when a parallax error is present, can result in an almost total lack of illumination of the viewed area as the distance between the area and the end of the speculum increases. In the endoscope of the present invention, however, the viewed and illuminated areas coincide irrespective of the diameter of the speculum or the distance between the speculum and the viewed area since the light beam reflected by mirror 46 travels along the optical axis of the sight passage.

It should also be noted that light source 28 can be placed directly, i.e. linearly, opposite mirror 46, and immediately adjacent but outside, the sight passage because the actual distance between mirror 46 and light source 28 is not fixed. That distance can be readily adjusted by increasing or decreasing the radius of curvature of the mirror which lengthens or shortens the focal length of the mirror. Thus, the light source can be placed at the optimal point within a given instrument without requiring compromises in the overall construction of the instrument. For example, a given length of an instrument can be maintained by merely selecting a mirror having a radius of curvature that permits the placement of the light source within such length. Such a positioning of the source prevents obstructions of the sight passage and permits the housing 14 to be of a sufficiently small size so that it can be easily and conveniently handled with only two fingers of a hand as fully described in the above-referenced, copending patent application entitled "ENDOSCOPE."

Referring to FIGS. 1 through 3, holder 54 mounts both light source 28 and lens 50 to assure their proper relative positioning. This provides a highly accurate positioning of the light and the lens with respect to mirror 46 while maintaining manufacturing costs low.

Holder 54 is defined by a lower base 80 which is integrally constructed with a pair of laterally spaced, upwardly extending legs 82 defining a generally semicircular cutout 83. A recess 84 has a curvature equal to that of lens 50 and is angularly inclined (see FIG. 2) with respect to the legs of the holder. Lens 50 is positioned in recess 84 and secured thereto with a bonding agent or by other suitable means such as spring rings, for example, or s setscrews (n (not shown).

Base 80 of the holder includes a threaded aperture (not shown) receiving the threaded socket (not shown) of light bulb 52 constructed as an elongate light bulb assembly. The light bulb assembly is preferably of the type having a cylindrical jacket 86 which terminates in the socket, houses the filament, and includes light-concentrating lens 58 as an integral part thereof. A terminal 88 is insulated from the base by an insulator strip 90 and electrically connects the bulb assembly with power source 26 on the side of the base facing toward the sight aperture 20. A rivet secures the terminal and the insulator to the base, extends through the base, and forms a rivet head 92 at the other side of the base. An electric terminal arm 94 is secured to the housing by a bolt 102, is electrically connected to power source 26, and includes a detent which engages rivet head 92. The terminal arm is spring biased toward holder 54 and the detent biases head 92, and therewith the holder, toward bottom member 96 of housing 14 to releasably secure the holder in the housing.

The holder is disposed in flat grooves 98 defined by walls 48 and which have a width slightly greater than that of the holder and extend over the full height of the walls. The holder engages the grooves snugly for purposes more fully set forth hereinafter. An aperture 100 in bottom member 96 is aligned with base 80 and sized to permit passage of an object (not shown) for ejecting the holder by moving the object against the holding force of terminal 94. Quick installation and removal of the holder is thus possible. It should also be noted that light bulb assembly 52 prevents the holder 54 from slideably moving out of grooves 98 as long as cover 76 is in place. Accidental loss of the holder is thereby prevented.

Terminal arm 94 is preferably integrally constructed with a second terminal arm 104 extending past an end of bottom member 96 and terminating in a detent. When power source 26 is mounted to housing 14 the detent on arm 104 engages one of a pair of contacts 106 electrically coupled with batteries 64 of the power source. The terminals may, of course, be connected with other electric power sources such as differently arranged or positioned batteries, rechargeable batteries, or a transformer (not shown). The second contact 106 of the power source is engaged by the detent on a terminal strip 108 which is insulated from housing 14 and holder 54 and conventionally electrically connected with switch 24 for the illumination of light bulb 52 by closing the switch to electrically connect the power source with housing 14 and therewith base 80 of holder 54. Terminal strip 108 is secured to housing 14 and spring biased toward the adjacent power source 26 so that its detent engages the second of the pair of contacts 106.

Power source 26 includes grooves 26a and housing 14 defines matching rails 14a (shown in FIG. 1) to permit the slideable engagement of the power source with the housing. When a forward end 26b of the power source abuts an end 96a of bottom member 96 the detents on terminal axis 104 and 108 engage contacts 106 on the power source and bias the latter toward end 96a of the bottom member to thereby releasably secure the power source to the housing. To disengage the two, force in the direction away from sight aperture 20 is applied to the power source to overcome the biasing force from the terminal arms and slideably disengage the power source from the housing.

Referring to FIGS. 1 and 2, if the endoscope is used as an otoscope for the examination of ears, it is frequently necessary to insert operating tools, such as a currette 114, shown in phantom lines, into the interior of the ear canal. To accommodate the insertion of the currette while viewing the illuminating the canal, housing 14 includes a cylindrically tubular portion 116 defining sight aperture 16, mounting speculum 22, and terminating in an opening 118 defined by the cylindrical portion of the housing and the end of walls 48. The opening is formed between the sidewalls and the cylindrical portion of the housing and commences at a straight side 119 of lens 50. A taper 121 is formed in the section of cylindrical portion 116 defining opening 118 to provide more space for manipulating the currette in the opening. Opening 118 permits the insertion of the currette in the direction of the optical axis of sight passage 16 so that the user of the endoscope can simultaneously view an area and work thereon with the currette or another tool (not shown). The area of the ear canal being worked on is at all times fully illuminated and magnified to provide the best possible working conditions.

From the foregoing, it can be seen that the present invention teaches a housing having a main portion forming a generally closed compartment defined by walls 48, holder 54, lens 50, cover 76, and block 32, combined with a cylindrical portion integrally secured thereto. The cylindrical portion includes a ring 116 for mounting speculum 22 and a connecting cylinder 120 which integrally secures the ring to the main housing portion. The cover 76 which defines a side of the main housing portion lies in a plane which intersects the plane of the ring at or near the center thereof; the ring lying in a plane generally perpendicular to the plane of cover 76 and perpendicular to sight passage 16. By disposing the ring to extend above the plane of cover 76 and by eliminating substantially all of the cylindrical connector between the ring and the main housing portion which lies above the plane of cover 76, an operating opening is formed which provides an extremely advantageous entrance for operating tools.

Referring to FIGS. 1, 2 and 4, it will be observed that the plane defined by the exterior side of cover 76 and straight side 119 of lens 50 is slightly inclined with respect to sight passage 16 through housing 14. The angular inclination is so chosen that operating tools, i.e. currette 114, can be laid flat against the exterior side of cover 76 and, in that position, project past the free, flanged end of speculum 22. This provides for an easy manipulation of the currette and allows it to be moved around to place the end of the currette disposed in the ear canal (not shown) at the desired working location. As a result of the position of cover 76 and to enable a free slideable movement of the cover in grooves 110 mirror 46 is provided with a straight edge 115 facing the cover. At least the portion of the mirror lying between mirror hole 44 and edge 115 preferably has a rectangular cross section to maximize the reflection of light from source 28.

Referring to FIGS. 1, 2, 8, and 9, pneumoscopy is a diagnostic aid in which the tympanic membrane is flexed by alternately applying releasing air pressure to and from the ear canal. Observation of the movement of the membrane gives physicians valuable clues as to its condition. The endoscope of this invention enables pneumoscopy with the simultaneous illumination and viewing of the membrane.

A porthole 122 is formed in housing 14 between lens 50 and sight aperture 20 and is adapted to receive a connecting nozzle 124 secured to one end of a conduit or hose 126 extending from a cap 128 of a bellows 130. The bellows is formed of a deformable material, such as plastic, for example, has a closed end 132 and a reduced-diameter tubular opening 134 onto which cap 128 is snapped. The otherwise conventionally formed cap includes a pair of shallow transverse grooves or slots 136 on its interior face resting against the end of tubular member 134 to communicate the interior of the bellows with hose 126. A helical compression spring 138 preferably has a diameter greater than the diameter of tubular member 134 to provide for equal distribution of the spring force onto end faces of the bellows and returns the bellows into its extended position after each compression thereof. The compression spring can be inserted in the bellows after the latter has been formed by "threading" the helical spring past tubular member 124 into the interior of the bellows.

Pneumoscopy is performed by inserting nozzle 124 into porthole 122, activating switch 24 to illuminate the light source 28, and holding the endoscope with one hand so that thumb 139 of the holding hand is disposed over opening 118 and seals with sides 120 and straight side 119 of lens 50. Holder 54, fitting snugly in grooves 98, and the lens seal the portion of the sight passage between the lens and the sight aperture from the viewing aperture and the remainder of the sight passage. The application of air pressure to the space defined by the sight aperture thereby causes that pressure to propogate through the bore in speculum 22 and into the ear canal (not shown).

The speculum is now inserted into the ear canal and its exteriorly flanged end 140 seals with walls (not shown) of the ear canal so that the compression of bellows 130 causes the application of air pressure to the tympanic membrane. Release of the bellows enables compression spring 138 to return the bellows to its extended position, thereby releasing the air pressure in the ear canal and returning the membrane to its normal position. A proper sizing of bellows 130, spring 138 and grooves 136 permits the forming of a slight vacuum when the bellows is released to deflect the membrane outwardly and increase its total movement. This movement of the membrane is fully illuminated and can be viewed through viewing aperture 18. The amount of deflection of the tympanic membrane can also be controlled by the force which is applied to compress the bellows. It should be noted that an over compression of the bellows, which could result in a sufficient pressure to damage the membrane, is not possible since the engagement between holder 54 and housing 14 in grooves 98 permits some passage of air therethrough. The interconnection between the holder and the housing thus additionally acts as a safety valve during pneumoscopy.

During pneumoscopy the hand holding the endoscope also seals opening 118 whereby the second hand of the operator is free for other tasks and for the actuation of the bellows. The quick disconnect feature of nozzle 124 and the fact that only one hand is necessary for the holding and sealing of the endoscope permits physicians to perform pneumoscopy immediately following a general examination of the ear by maintaining the endoscope in position, connecting the bellows and the nozzle thereto and compressing the bellows. There is, therefore, no need for separate instruments, tediously assembling the endoscope with an air pump, etc., all of which is time consuming and wasteful.

The above-described endoscope is particularly well adapted for the examination of relatively short cavities such as the ear canal or nose, for example. In such instances, the distance between the sight aperture, or the speculum, and the viewed area are relatively constant so that no adjustability in the optical and illumination systems is ordinarily necessary. If more distal objects (not shown) are to be viewed, such as objects at the end of tubes or pipes having a length of many feet, the above-described endoscope does not yield best results since the focal point of the reflected light beam is relatively close to the end of speculum 22 and the light thereafter diffuses so that the actual light intensity at the viewed area is low. In addition, lens 50 focuses on an area within a relatively narrow range of distances from the speculum so that viewed areas being outside that range and further away from the speculum are blurred and can become nondiscernable.

Referring to FIG. 7, an endoscope 142 for the viewing of close as well as distal objects comprises a housing 144, which is substantially identical to housing 14 described above, having a sight passage 146 between a viewing aperture 148 and an aligned, spaced-apart sight aperture 150, a speculum 152 and a light shield assembly 154 all constructed and functioning identically with the corresponding elements shown in FIGS. 1 through 5 and described above. A light source 156, however, is mounted on a sled 158 which includes lateral flanges engaged and guided by angularly inclined guide ways 160 formed on the interior side of walls 162 of the housing. The sled mounts a light bulb 164 and connects it with a terminal arm 166 in slideable engagement with a terminal rail 168 extending over the length the sled coupled with a contact 170 of an electric power source 172. An upwardly extending portion of the sled includes a threaded aperture 174 in an engagement with a threaded lead screw 176 extending through the housing to the exterior thereof and being operable so that its rotation moves the sled and the light bulb towards or away from convex mirror 46.

As briefly referred to earlier, when the distance between light bulb 164 and the mirror equals the focal length of the latter, light rays reflected by the mirror travel parallel to the optical axis of sight passage past the sight aperture and through the bore of the speculum without focusing at any finite point. The sled and the guideways are arranged so that the distance between the light bulb and the mirror can be varied by rotating lead screw 176 to move the light source closer to or further away from the mirror. The degree of convergence of the reflected light beam is thereby adjusted to place its point of convergence, or focal point, at any desired distance from the sight aperture 150 of the endoscope. Thus, it is possible to focus the light on objects (not shown) spaced many feet or yards from the sight aperture.

Since the observation of an area with a naked eye at distances of several feet or yards is difficult and often fails to reveal smaller details, a magnifying lens 178 can be inserted into sight passage 146 from viewing aperture 148. The magnifying lens is removable to permit its replacement with lenses having different magnification factors and is disposed in a tubular lens holder 180 inserted in large bore 38 of the block. The lens holder may simultaneously hold more than one lens to increase the desired magnification factor. Undercut 36 of block 32 is provided to at least partially receive an enlarged-diameter portion 194 of holder 180 to minimize the length of such portion protruding past the end of block 32 and the endoscope while enabling the removal of the holder by inserting a thin object (not shown) in the undercut between the block and the end of portion 194.

A light converging lens 182 can be placed in the sight passage between mirror 46 and the sight aperture to concentrate light reflected from the mirror. The lens is shaped to focus the reflected light beam at the desired distance from the sight passage. It can further include a central aperture 184 defining a portion of the sight passage so that the latter is unobstructed and permits the viewing of objects irrespective of their distance from the endoscope with or without an additional magnifying lens 178.

Referring to FIG. 10, the endoscope is adjusted for use by persons of normal sight, either naturally or as corrected with eyeglasses. If a person wears bifocal glasses, his head must be tilted backwards to align his viewing eye with the viewing aperture and the lower half of the bifocal glasses. To facilitate the ease with which the endoscope is used by such persons, an eye piece correction lens 186 can be mounted in a cylindrical tubular holder 188 which has a cylindrical member 190 formed to be placed into bore 38 (see FIG. 2) of block 32. The correction lens is formed to compensate for the sight deficiency of the user when looking at relatively close objects through the upper half of the bifocals and permits him to view the illuminated area by looking straight through the upper half of his glasses without tilting his head.

Referring to FIG. 7 and 10, lens holder 180 preferably includes an enlarged recessed bore 192 at its outer end 194 which has an inner diameter equal to that of bore 38 in block 32 to enable the placement of holder 188 therein. A bifocal wearer using the eye correction lens can thus take advantage of the image magnification from the use of magnifying lens 178 in holder 180.

The magnification lens and holder can also be inserted in endoscope 12, illustrated in FIGS. 1 through 5, which does not have an adjustably mounted light source to obtain a greater image of the viewed illuminated area seen at viewing aperture 18 through lens 50.

Modification in the construction of the endoscope can, of course, be made without departing from the scope of this invention. For example, the exact positioning of the light source with respect to the mirror and the latter's focal length can be varied to obtain light converging or diverging effects for particular applications. The shape of the housing may depart from that illustrated in the drawings; or the manner in which the endoscope is connected with the power source may be altered.

I claim:

1. An endoscope for viewing an image of a cavity or the like comprising:
    a housing having a viewing aperture and a sight aperture visible through said viewing aperture and separated by a sight passage; said housing formed to have an opening to its interior between said viewing aperture and said sight aperture, and said housing having means to demountably receive and retain a holder means adjacent said opening;
    reflector means disposed intermediate said viewing aperture and said sight aperture defining a portion of the sight passage;
    holder means demountably secured in said housing between said reflector means and said sight aperture and adjacent said opening, said holder means having a dimension smaller than said opening whereby said holder means is disposed in said means through said opening;
    an electrical light source mounted to said holder means and disposed to direct light onto said reflector means to provide reflected light for passage along said sight passage and through said sight aperture; and
    a lens secured to said holder means and disposed in the sight passage for converging reflected light at a point beyond the sight aperture.

2. An endoscope according to claim 1 wherein said holder means is slideably disposed in grooves defined by said housing, and wherein said housing includes a second opening adjacent said holder means and opposing said first-named opening whereby an object can be inserted through said second opening to eject said holder means from said housing through said first-named opening.

3. The endoscope according to claim 2 further comprising cover means releasably secured to said housing covering a portion at least of said first-named opening reducing the dimensions thereof to prevent ejection of said holder means without first removing said cover means.

4. An endoscope according to claim 1 including an electrical terminal mechanically secured to said housing and forming an electrical connection between said light source and an electrical power source, and wherein said terminal is spring biased into engagement with said holder means releasably securing said holder means to said housing.

5. The endoscope according to claim 1 further comprising a cover means releasably secured to said housing and defining with said holder means a closed compartment within said housing including said reflector means, said lens, and said light source.

6. The endoscope according to claim 5 wherein the surface of said cover means facing the interior of said compartment is a nonreflective surface.

7. An endoscope according to claim 1, wherein the lens includes a central aperture providing an unobstructed view between the viewing and the sight apertures while converging light reflected by the reflector on the area.

8. An endoscope for viewing an image of a cavity or the like comprising in combination:
    a main housing portion forming a generally closed compartment and defining a viewing aperture and containing an illumination system including a reflector;
    a second housing portion integrally formed to said main portion in opposition to said viewing aperture and defining a sight aperture visible along a sight axis from said viewing aperture through said main housing portion, said second portion defining an operating opening between said main housing portion and said sight aperture for the admission of operating tools;

a side-defining part of said main housing portion between said operating opening and said viewing aperture disposed in a plane which is angularly inclined with respect to the sight axis, which plane intersects the plane of said aperture near the center thereof; and said second housing portion having mounting means formed and dimensioned to demountably secure a detachable speculum thereto.

9. An endoscope according to claim 8 wherein said side-defining part is a cover removably mounted to said main housing portion, and wherein reflector means is disposed interiorly of the compartment and is defined by a straight edge proximate said cover.

10. The endoscope of claim 8 wherein said second portion is further defined by a tapered edge defining said operating opening to increase the entrance for tools.

11. An endoscope according to claim 8 further including means pneumatically separating said operating opening from said viewing aperture.

12. The endoscope of claim 11, wherein said last-named means includes a lens holder and lens disposed between said operating opening and said viewing aperture and located to position said lens in said sight passage to permit the viewed image to be magnified.

13. An endoscope according to claim 11, including a speculum secured to the housing adjacent and aligned with the sight aperture for the viewing of a cavity in which the area is disposed, a free end of the speculum having an exterior annular flange adapted to seal with walls defining the cavity.

14. An endoscope according to claim 11 wherein the housing includes a porthole adjacent and in flow communication with the sight aperture and adapted to receive a source of pressurized gas.

15. An endoscope according to claim 14 wherein the operating opening is formed to have a periphery which is adapted to be pneumatically sealed by a thumb overlayed thereon.

16. The endoscope of claim 8, wherein said second housing portion comprises a mounting ring for receiving and holding specula and defining said sight aperture, said ring disposed in a plane generally perpendicular to the plane of said side part of said main housing portion and held in a location where the plane of said side part passes close to the center of said ring; and a connecting cylinder integrally attaching said ring to said main body portion wherein substantially all of said connecting cylinder between the plane of said side part and said ring is removed to form said operating opening.

UNITED STATES PATENT OFFICE
CERTIFICATE OF CORRECTION

Patent No. 3,596,653          Dated August 3, 1971

Inventor(s) John E. Hotchkiss

It is certified that error appears in the above-identified patent and that said Letters Patent are hereby corrected as shown below:

Column 1, lines 24-25, delete "speculum source which directs light through a sight aperture and".

Column 6, line 8, after "or", delete --s--; after "setscrews", delete --(n--.

Column 6, line 74, after "viewing", delete --the-- and insert "and".

Column 11, claim 8, line 7, after "said", insert --sight--.

Signed and sealed this 21st day of March 1972.

(SEAL)
Attest:

EDWARD M. FLETCHER, JR.          ROBERT GOTTSCHALK
Attesting Officer          Commissioner of Patents